(12) United States Patent
Kim

(10) Patent No.: US 11,912,065 B2
(45) Date of Patent: Feb. 27, 2024

(54) CONSTANT VELOCITY JOINT FOR VEHICLE

(71) Applicant: Hyundai Wia Corporation, Gyeongsangnam-Do (KR)

(72) Inventor: Dong Woo Kim, Gyeonggi-Do (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 367 days.

(21) Appl. No.: 17/329,801

(22) Filed: May 25, 2021

(65) Prior Publication Data
US 2021/0370716 A1  Dec. 2, 2021

(30) Foreign Application Priority Data

May 27, 2020  (KR) .......................... 10-2020-0063714

(51) Int. Cl.
  *B60B 27/00*  (2006.01)
  *F16D 3/84*  (2006.01)
  *F16D 3/30*  (2006.01)

(52) U.S. Cl.
  CPC ...... *B60B 27/0036* (2013.01); *B60B 27/0073* (2013.01); *F16D 3/30* (2013.01); *F16D 3/845* (2013.01); *B60B 2310/306* (2013.01); *B60B 2900/5112* (2013.01); *Y10S 464/906* (2013.01)

(58) Field of Classification Search
  CPC ............ B60B 27/0036; B60B 27/0073; B60B 2310/306; B60B 2900/5112; F16D 3/30; F16D 3/845; Y10S 464/906
  USPC .............. 464/178; 384/544, 589; 280/93.512
  See application file for complete search history.

(56) References Cited

U.S. PATENT DOCUMENTS

| 5,762,559 A | * | 6/1998 | Jacob | ................... B60B 27/0005 |
| | | | | 464/178 |
| 5,975,767 A | * | 11/1999 | Mizukoshi | .......... B60B 27/0042 |
| | | | | 384/544 |
| 6,280,336 B1 | | 8/2001 | Sone et al. | |

(Continued)

FOREIGN PATENT DOCUMENTS

| CN | 101868660 A | 10/2010 |
| CN | 204099409 U | 1/2015 |
| CN | 110462237 A | 11/2019 |

(Continued)

OTHER PUBLICATIONS

Notice of Allowance issued in corresponding Chinese Patent Application No. 202110571835.2.

*Primary Examiner* — Greg Binda
(74) *Attorney, Agent, or Firm* — Fox Rothschild LLP

(57) ABSTRACT

A constant velocity joint for a vehicle is provided and may include hub housing, a bearing assembly, a power transmission member, and a boot. The hub housing is combined with the constant velocity joint in the hub housing. The bearing assembly includes an inner race fitted on an outer surface of the hub housing, an outer race spaced a predetermined distance apart from the inner race and fitted on a knuckle. The power transmission member is disposed between the inner race and the outer race. The boot has a band seat positioned on the inner race and a fixing band fixed on a top of the boot and the boot is coupled to the inner race by the fixing band. The boot further includes a boot lip that is formed at one end or both ends of the band seat and protrudes toward the knuckle.

8 Claims, 6 Drawing Sheets

(56) References Cited

U.S. PATENT DOCUMENTS

2022/0258530 A1* 8/2022 Jeong .................. B60B 27/0005

FOREIGN PATENT DOCUMENTS

| | | | |
|---|---|---|---|
| CN | 110481315 | A | 11/2019 |
| CN | 210257828 | U | 4/2020 |
| JP | H 11153611 | A | 6/1999 |
| JP | 3932630 | B2 | 6/2007 |
| JP | 2008094156 | A | 4/2008 |
| JP | 2019-158044 | A | 9/2019 |
| KR | 10-2017-0136104 | A | 12/2017 |
| KR | 10-2064275 | B1 | 1/2020 |
| WO | 2019/194548 | A1 | 10/2019 |

* cited by examiner

CONSTANT VELOCITY JOINT FOR VEHICLE

CROSS REFERENCE TO RELATED APPLICATION

The present application claims under 35 U.S.C. § 119(a) the benefit of Korean Patent Application No. 10-2020-0063714, filed on May 27, 2020, the entire contents of which are incorporated by reference herein.

BACKGROUND

(a) Technical Field

The present disclosure relates to a constant velocity joint for a vehicle, more particularly, to the constant velocity joint for automotive use having a structure that can prevent foreign substances from entering the constant velocity joint from an outside.

(b) Description of the Related Art

In general, hubs and bearings are installed on tire wheels connected to a drive axle and used to support loads in up-down and front-rear directions of a vehicle and horizontal loads caused by turning of the vehicle. A constant velocity joint is installed on the drive axle of the vehicle and used to transmit power from a transmission to wheels. The constant velocity joint, a hub, and a bearing are usually separately assembled by fasteners to be used as a single unit.

According to the structure of a conventional constant velocity joint of the related art, a bearing assembly is coupled to a knuckle, and the bearing assembly and the constant velocity joint are combined. The distance between an outer race of the constant velocity joint and the knuckle is minimized to prevent foreign substances from entering the assembled constant velocity joint from an outside. If a foreign substance enters a constant velocity joint from the outside, the foreign substance may enter a bearing assembly through a bearing seal, which may cause abnormal noise or shaking of the bearing, and thus may damage the bearing. In order to solve this problem, a lip of the bearing seal is overlapped by a maximum amount to seal a bearing assembly, but there is a problem that bearing drag torque is increased.

Accordingly, it would be desirable to develop a technology that can effectively block foreign substances that enter a bearing assembly from the outside and can reduce bearing drag torque.

The description provided above as a related art of the present disclosure is just for helping understanding the background of the present disclosure and should not be construed as being included in the related art known by those skilled in the art.

SUMMARY

An objective of the present disclosure is to provide a constant velocity joint for a vehicle that can effectively block foreign substances that enter the constant velocity joint and can reduce bearing drag torque.

In order to achieve the objectives of the present disclosure, a constant velocity joint for a vehicle according to the present disclosure includes: a hub housing combined with the constant velocity joint in the hub housing; a bearing assembly including an inner race fitted on an outer surface of the hub housing, an outer race spaced a predetermined distance apart from the inner race and fitted on a knuckle, and a power transmission member disposed between the inner race and the outer race; and a boot having a band seat that is positioned on the inner race of the bearing assembly, the boot having a fixing band fixed on a top of the boot and the boot being coupled to the inner race by the fixing band, wherein the boot includes a boot lip that is formed at one end or both ends of the band seat and protrudes toward the knuckle.

The boot lip may protrude toward the knuckle from the end of the band seat which faces an outside or an inside of a vehicle, thereby preventing foreign substances entering between the boot and the knuckle from entering the bearing assembly.

The boot lip may protrude toward the knuckle from the both ends of the band seat which face the outside and the inside of a vehicle, thereby doubly preventing foreign substances entering between the boot and the knuckle from entering the bearing assembly.

A length of the boot lip may be 3 mm to 10 mm.

The distance between the boot and the knuckle may be 0.5 mm to 1 mm.

A forming portion that presses the inner race may be formed at the hub housing by bending up an end of the hub housing toward the inner race.

The boot may further have a boot seat seated on the forming portion of the hub housing and a thickness of the boot seat is 5 mm or more Bearing seals may be disposed between the inner race and both sides of the outer race.

According to the present disclosure, since the boot lip protrudes toward the knuckle from one or more of the ends of the band seat which face the outside or the inside of a vehicle, it is possible to prevent foreign substances that enter between the boot and the knuckle from entering the bearing assembly. Further, since the movement path of foreign substances entering between the boot and the knuckle is bent like a labyrinth, even if foreign substances enter from the outside, it is possible to reduce the foreign substances entering the bearing assembly.

Further, according to the structure, since foreign substances entering between the boot and the knuckle is prevented from entering the bearing assembly, the ability to seal the bearing assembly can be maintained even if the overlap amount of the bearing seal is reduced.

Further, when the amount of overlap of the bearing seal is reduced, drag torque of the bearing assembly can be decreased, whereby the entire fuel efficiency of a vehicle can be improved.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Constant velocity joints for a vehicle according to exemplary embodiments of the present disclosure are described hereafter in detail with reference to the accompanying drawings.

Figure 1:
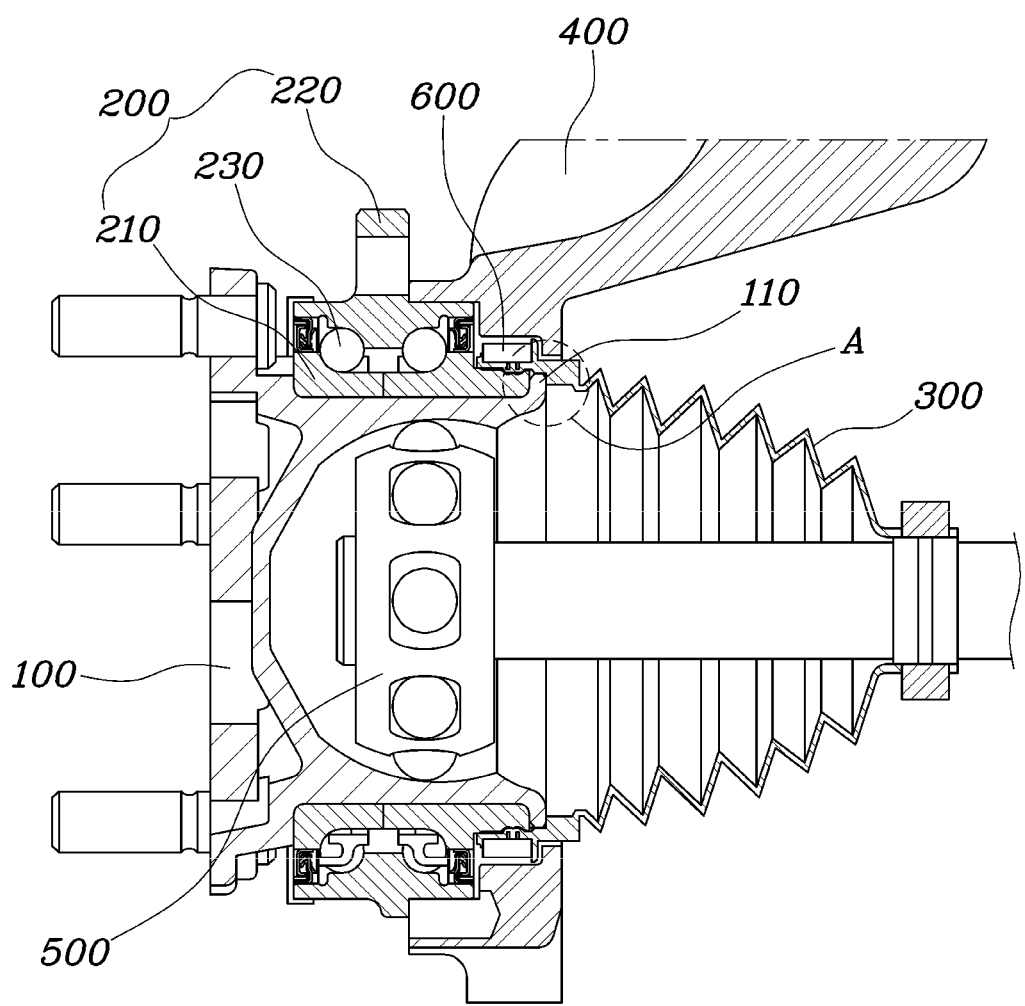
FIG. 1 is a view showing a constant velocity joint for a vehicle according to an embodiment of the disclosure.
Figure 2:
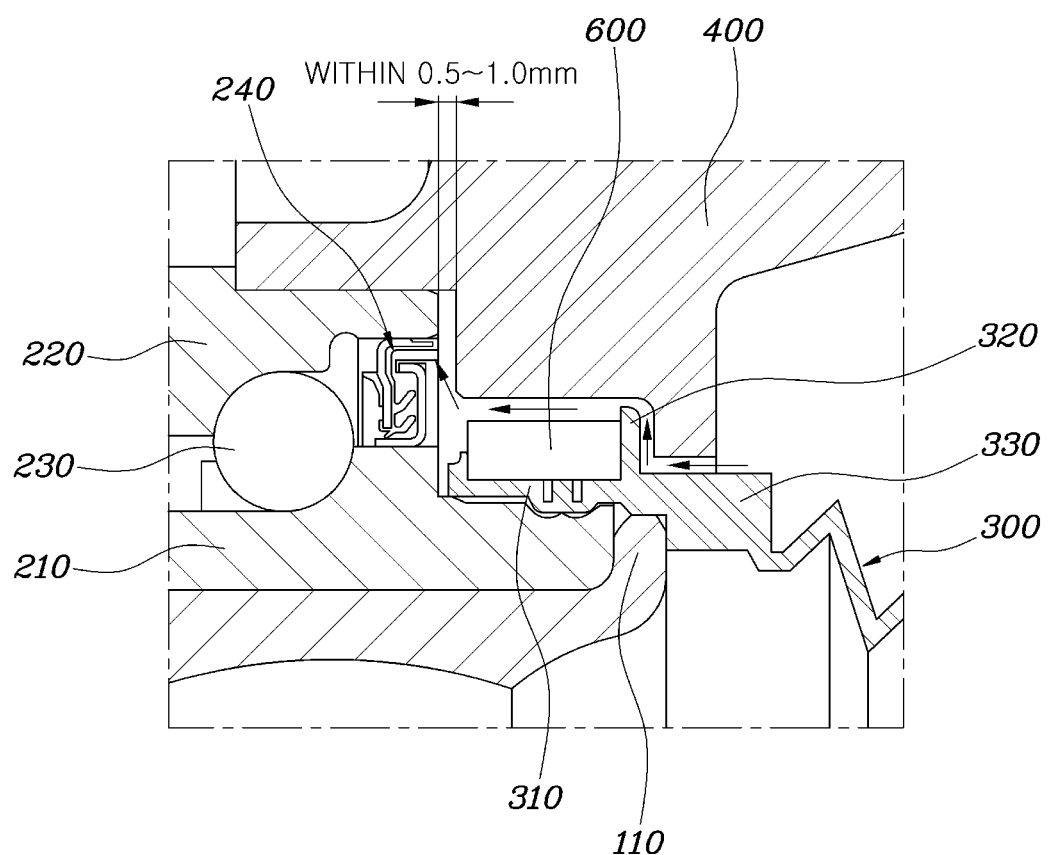
FIG. 2 is an enlarged view of the part A of FIG. 1.

FIG. 1 is a view showing a constant velocity joint for a vehicle according to an embodiment of the disclosure and FIG. 2 is an enlarged view of the part A of FIG. 1.

Referring to FIGS. 1 and 2, a constant velocity joint for a vehicle according to an embodiment of the present disclosure may include a hub housing 100, a bearing assembly 200, and a boot 300.

The hub housing 100 is configured by integrating a wheel hub and the outer race of a constant velocity joint 500, and the constant velocity joint 500 is coupled in the hub housing 100, thereby being able to transmit driving torque from an engine to a wheel.

Since the hub housing 100 is configured by integrating the wheel hub and the outer race of the constant velocity joint 500, the center of the constant velocity joint 500 is moved to an outside of a vehicle, so the length of a drive shaft can be increased, and accordingly, an articulation angle of a drive shaft of the constant velocity joint 500 can be improved.

Further, since the hub housing 100 is configured by integrating the wheel hub and the outer race of the constant velocity joint 500, it is possible to reduce a weight and manufacturing cost by removing a coupler between the wheel hub and the constant velocity joint 500 in the related art. Further, as the weight is reduced, it is possible to improve the fuel efficiency, and to reduce or eliminate problems such as noise due to a coupler and inferior quality due to loosening of a wheel hub nut that fixes a constant velocity joint housing and the wheel hub.

A forming portion 110 that presses an inner race 210 fitted on the outer surface of the hub housing 100 may be formed at the hub housing 100 by bending an end of the hub housing 100 toward the inner race 210. The forming portion 110 may be formed by orbital forming. Pre-load can be applied to the inner race 210 of the bearing assembly 200 by the forming portion formed at the hub housing 100. The pre-load may be the magnitude of elastic compressive deformation due to a predetermined force that is axially applied when some of the parts of the bearing assembly 200 are assembled.

The bearing assembly 200 may include an inner race 210 fitted on the outer surface of the hub housing 100, an outer race 220 spaced a predetermined distance apart from the inner face 210 and fitted on a knuckle 400, and a power transmission member 230 disposed between the inner race 210 and the outer race 220.

In particular, the inner race 210 may be forcibly fitted on the outer surface of the hub housing 100 and can rotate with the hub housing 100. The inner race 210 may also function as an inner track of the bearing assembly 200.

The outer race 220 may be disposed at a predetermined distance from the inner race 210 of the bearing assembly 200 and functions as an outer track of the bearing assembly 200. The outer race 220 is coupled to the knuckle 400, so the outer race 220 may be a non-rotary element of which the position is not changed.

The power transmission member 230 may be disposed between the inner race 210 and the outer race 220. Depending on particular embodiments, the power transmission member 230 may be a ball or a roller and can rotate on the track portions of the outer race 220 and the inner race 210.

The boot 300 may prevent grease from leaking out of the constant velocity joint 500 and may prevent foreign substances from entering the constant velocity joint 500.

In particular, the boot 300 may have a band seat 310 and a boot lip 320 and may further have a boot seat 330.

Further, the band seat 310 is positioned on top of the inner race 210 of the bearing assembly 200, and a fixing band 600 is disposed on the band seat 310. The boot 300 can be coupled to the inner race 210 of the bearing assembly 20P by the fixing band 600.

As described above, since the boot 300 is disposed on the inner race 210 of the bearing assembly 200 and is coupled to the inner race 210 by the fixing band 600 in the constant velocity joint 500 for a vehicle according to an embodiment of the present disclosure, the constant velocity joint 500 can be made compact with the hub housing 100 to which orbital forming is applied.

Referring to FIGS. 2 to 6, the boot lip 320 may be formed at one end or both ends of the band seat 310 and may protrude toward the knuckle 400.

Figure 3:
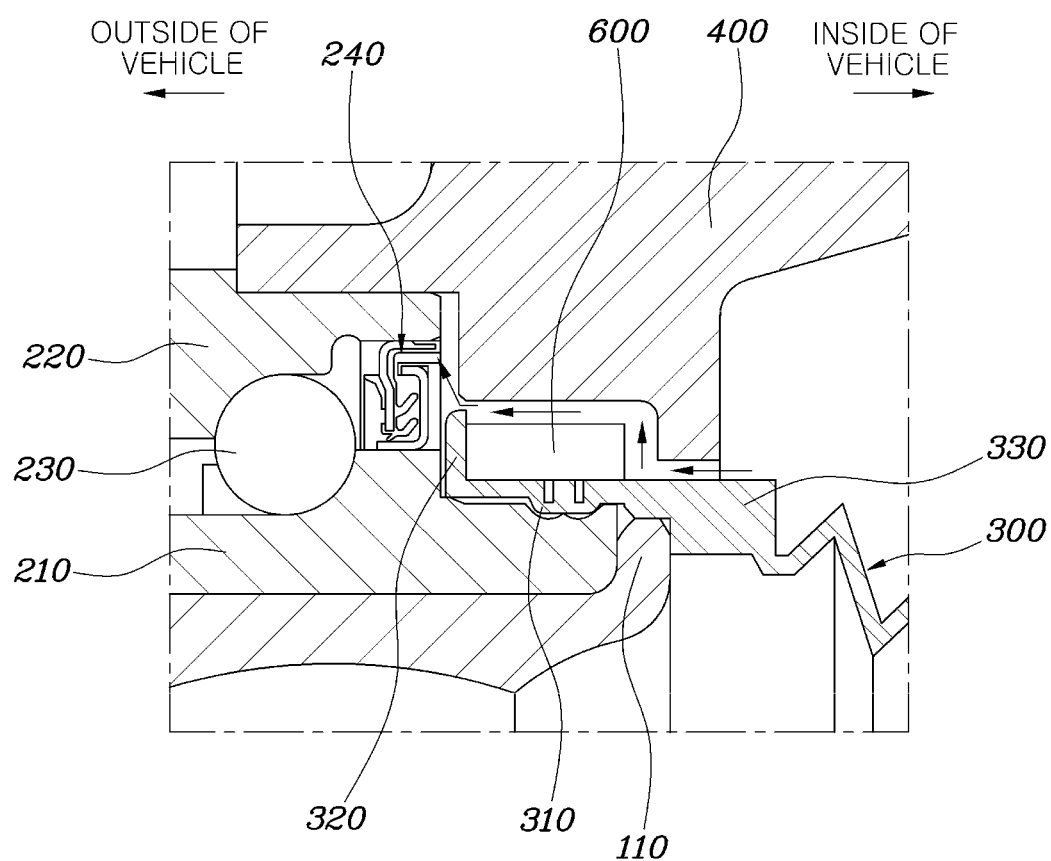
FIG. 3 is a view showing a constant velocity joint for a vehicle according to another embodiment of the disclosure.
Figure 5:
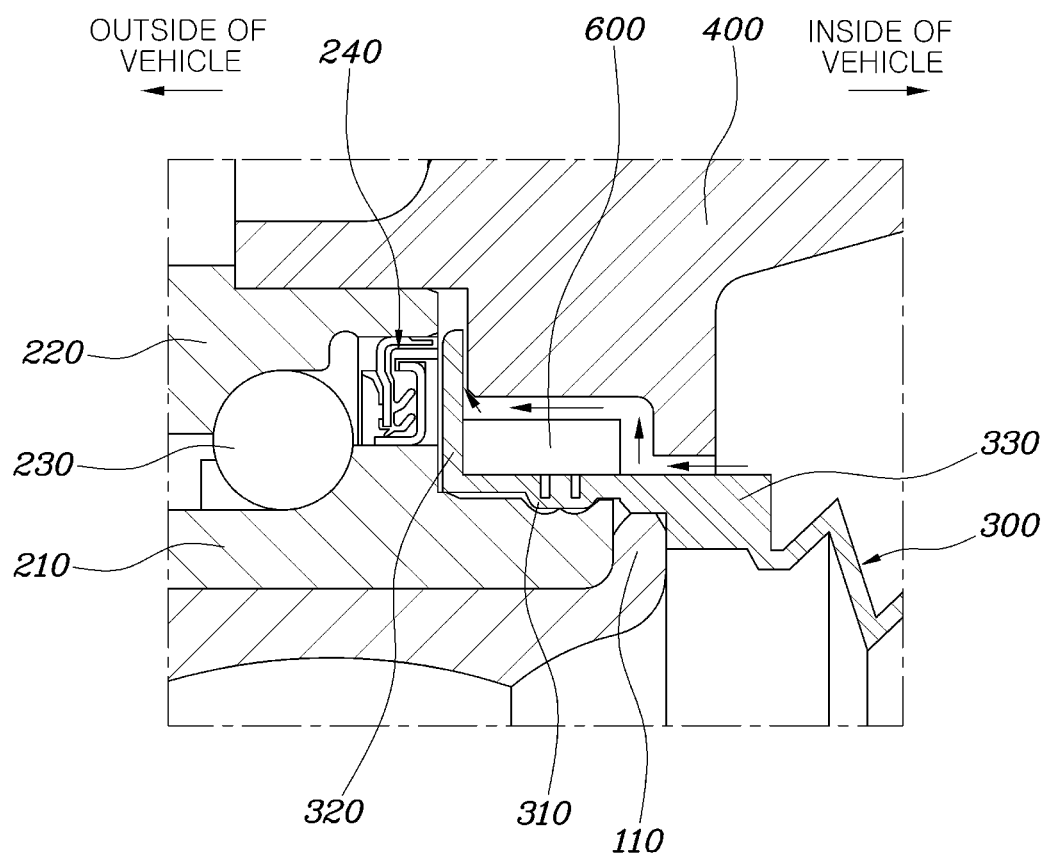
FIG. 5 is a view showing a constant velocity joint for a vehicle according to another embodiment of the disclosure.

In detail, as shown in FIGS. 2, 3, and 5, the boot lip 320 may protrude toward the knuckle 400 from the one end of the band seat 310 which faces the outside or the inside of a vehicle.

Figure 4:
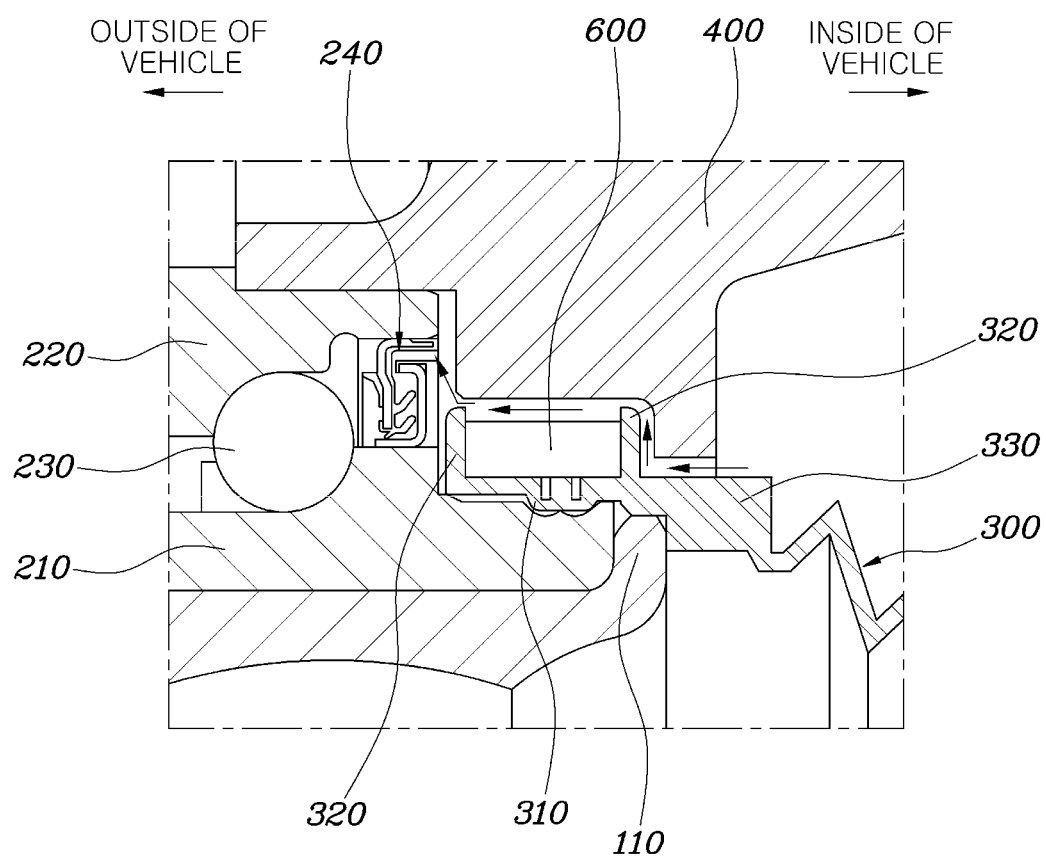
FIG. 4 is a view showing a constant velocity joint for a vehicle according to another embodiment of the disclosure.
Figure 6:
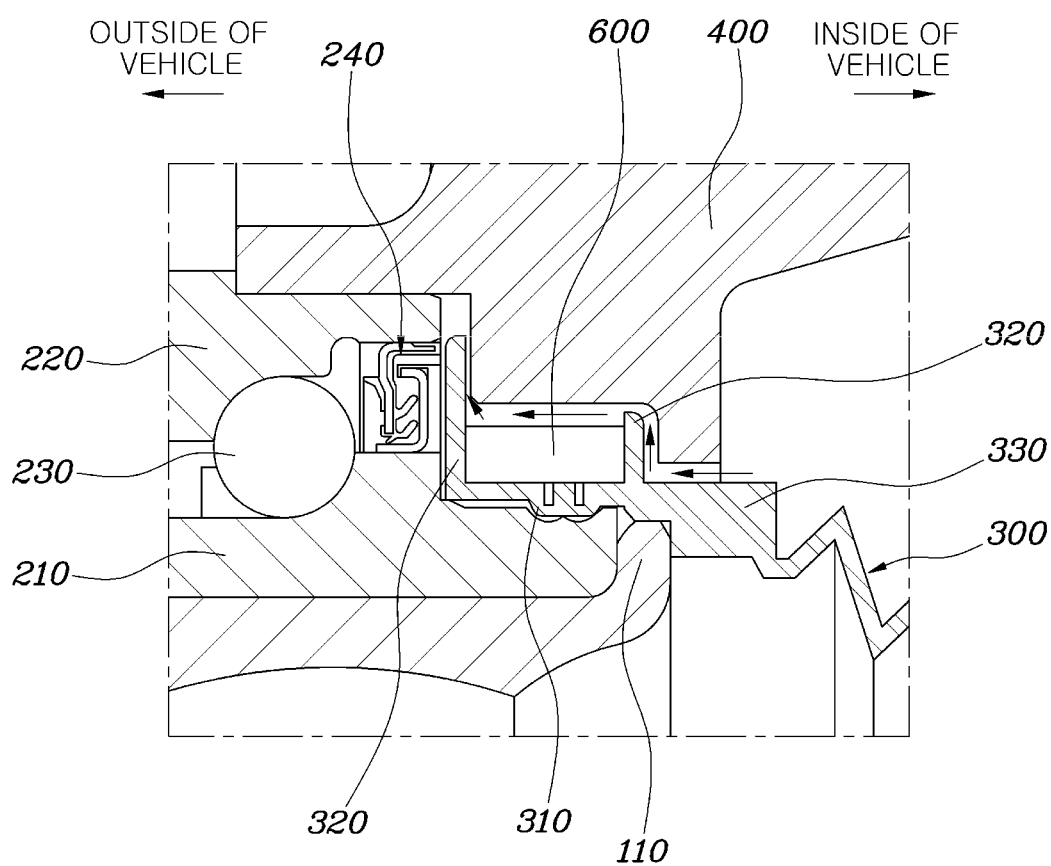
FIG. 6 is a view showing a constant velocity joint for a vehicle according to another embodiment of the disclosure.

The boot lip 320, as shown in FIGS. 4 and 6, protrudes toward the knuckle 400 from the both ends of the band seat 310 which faces the outside or the inside of a vehicle, so foreign substances that enters between the boot 300 and the knuckle 400 can be doubly prevented from entering the bearing assembly 200.

Since the boot lip 320 protrudes toward the knuckle 400 from one or more of the ends of the band seat 310 which face the outside or the inside of a vehicle, it can prevent foreign substances that enters between the boot 300 and the knuckle 400 from entering the bearing assembly 200.

Further, since the boot lip 320 protrudes toward the knuckle 400 from one or more of the ends of the band seat 310 which face the outside or the inside of a vehicle, the movement path of foreign substances entering between the boot 300 and the knuckle 400 is bent like a labyrinth, whereby it is possible to reduce the external foreign substances entering the bearing assembly 200 after entering the inside.

The length of the boot lip 320 may be determined in consideration of the thicknesses of the boot 300 and the fixing band 600. Depending on particular embodiments, the length of the boot lip 320 may be 3 mm to 10 mm.

Depending on particular embodiments, as shown in FIG. 5, the boot lip 320 may protrude toward the knuckle 400 at the end of the band seat 310 which faces the outside of a vehicle. In this case, the boot lip 320 protrudes up to the upper end of the bearing seal 240, thereby being able to more effectively prevent foreign substances from entering the bearing seat 240. In this case, the length of the boot lip 320 may be 3 mm to 10 mm.

Depending on particular embodiments, as shown in FIG. 6, the boot lip 320 may protrude toward the knuckle 400 from the ends of the band seat 310 which face the inside and outside of a vehicle. In this case, the lengths of the boot lip 320 at the end facing the inside of a vehicle and the boot lip 320 at the end facing the outside of a vehicle may be different. In particular, the length of the boot lip 320 at the end facing the inside of a vehicle may be 3 mm to 5 mm, depending on particular embodiments. Further, the boot lip 320 at the end facing the outside of a vehicle may have a length of 3 mm to 10 mm to protrude up to the upper end of the bearing seal 240, depending on particular embodiments.

As described above, since the boot lip 320 protrudes toward the knuckle 400 from the ends of the band seat 310 which face the outside or the inside of a vehicle and the boot lip at the end facing the outside of a vehicle protrudes up to the upper end of the bearing seal 240, it is possible to more effectively prevent foreign substances that have entered between the boot 300 and the knuckle 400 from entering the bearing assembly 200.

The distance between the boot 300 and the knuckle 400 may be 0.5 mm to 1.0 mm. In particular, the distance between the upper end of the boot 300 and the knuckle 400 may be 0.5 mm to 1.0 mm. Further, the distance between the bearing assembly 200 and the knuckle 400 may be 0.5 mm to 1.0 mm.

As described above, in the constant velocity joint 500 for a vehicle according to an embodiment of the present disclosure, the length of the boot lip 320 is 3 mm to 10 mm, the distance between the boot 300 and the knuckle 400 is 0.5 mm to 1 mm, and the distance between the bearing assembly 200 and the knuckle 400 is 0.5 mm to 1 mm, whereby the gap between the boot 300 and the knuckle 400 and the gap between the bearing assembly 200 and the knuckle 400 are minimized. Accordingly, even if foreign substances enter between the boot 300 and the knuckle 400 from the outside, the amount of foreign substances that actually enter the bearing assembly 200 can be minimized.

Meanwhile, the boot 300 may further has the boot seat 330 seated on the forming portion 110 of the hub housing 100. The boot seat 330 is formed with a predetermined or more thickness, and, depending on particular embodiments, may have a thickness of 5 mm or more.

In general, if the boot lip 320 is moved, there is a problem that the knuckle 400 is rubbed and abnormal noise of the bearing assembly 200 is caused. In order to solve this problem, it is required to increase the rigidity of the boot lip 320, and to this end, the boot lip 320 may have a predetermined or more thickness.

If the thickness of the boot seat 330 is 5 mm or less, when the boot 300 is articulated, interference with the knuckle 400 is generated by movement of the boot lip 320. Accordingly, the thickness of the boot seat 330 may be 5 mm or more.

Meanwhile, as shown in FIGS. 1 to 6, bearing seals 240 may be disposed between the inner race 210 and both sides of the outer race 220 of the constant velocity joint 500 for a vehicle according to an embodiment of the present disclosure.

The constant velocity joint for a vehicle according to an embodiment of the present disclosure which has a structure that may prevent foreign substances entering between the boot 300 and the knuckle 400 from entering the bearing assembly 200, as described above, has the following effects.

Further, since the boot lip 320 protrudes toward the knuckle 400 from one or more of the ends of the band seat 310 which face the outside or the inside of a vehicle, it is possible to prevent foreign substances that enter between the boot 300 and the knuckle 400 from entering the bearing assembly 200. Further, since the movement path of foreign substances entering between the boot 300 and the knuckle 400 is bent like a labyrinth, even if foreign substances enter from the outside, it is possible to reduce the foreign substances entering the bearing assembly 200.

Further, according to the structure, since foreign substances entering between the boot 300 and the knuckle 400 may be prevented from entering the bearing assembly 200, the ability to seal the bearing assembly 200 can be maintained even if the overlap amount of the bearing seal is reduced.

Further, when the amount of overlap of the bearing seal 240 is reduced, drag torque of the bearing assembly 200 can be decreased, whereby the entire fuel efficiency of a vehicle can be improved.

What is claimed is:

1. A constant velocity joint for a vehicle, the constant velocity joint comprising:
   a hub housing combined with the constant velocity joint in the hub housing;
   a bearing assembly including an inner race fitted on an outer surface of the hub housing, an outer race spaced a predetermined distance apart from the inner race and fitted on a knuckle, and a power transmission member disposed between the inner race and the outer race; and
   a boot having a band seat that is positioned on the inner race of the bearing assembly, the boot having a fixing band fixed on a top of the boot and the boot being coupled to the inner race by the fixing band, wherein the boot includes a boot lip that is formed at one end or both ends of the band seat and protrudes toward the knuckle;

wherein the boot and the knuckle are spaced apart from each other by a gap;

wherein the bearing assembly and the knuckle are spaced apart from each other by the gap, and wherein, in the gap, the boot lip is formed to protrude towards the knuckle from at least one of an outer end of the band seat which faces an outside of a vehicle or an inner end of the band seat which faces an inside of the vehicle, thereby preventing foreign substances from penetrating into the bearing assembly by bending a movement path of the foreign substances entering between the boot and the knuckle.

2. The constant velocity joint of claim 1, wherein the boot lip protrudes toward the knuckle from both the outer and inner ends of the band seat, thereby doubly preventing foreign substances entering between the boot and the knuckle from entering the bearing assembly.

3. The constant velocity joint of claim 1, wherein a length of the boot lip is 3 mm to 10 mm.

4. The constant velocity joint of claim 1, wherein a distance between the boot and the knuckle is 0.5 mm to 1 mm.

5. The constant velocity joint of claim 1, wherein a distance between the bearing assembly and the knuckle is 0.5 mm to 1 mm.

6. The constant velocity joint of claim 1, wherein a forming portion that presses the inner race is formed at the hub housing by bending up an end of the hub housing toward the inner race.

7. The constant velocity joint of claim 6, wherein the boot further has a boot seat seated on the forming portion of the hub housing and a thickness of the boot seat is 5 mm or more.

8. The constant velocity joint of claim 1, wherein bearing seals are disposed between the inner race and both sides of the outer race.

* * * * *